(12) United States Patent
Quast

(10) Patent No.: US 6,464,592 B1
(45) Date of Patent: Oct. 15, 2002

(54) DEVICE FOR CLEANING AND RESTORING THREADS OF A THREADED ARTICLE

(76) Inventor: David L. Quast, 20982 Oakville, Lake Forest, CA (US) 92630-7074

( * ) Notice: Subject to any disclaimer, the term of this patent is extended or adjusted under 35 U.S.C. 154(b) by 0 days.

(21) Appl. No.: 09/860,316

(22) Filed: May 18, 2001

(51) Int. Cl.⁷ .................................................. B21J 13/02
(52) U.S. Cl. ........................ 470/183; 470/66; 470/185; 470/207; 72/409.01; 81/421
(58) Field of Search ................ 470/57, 58, 66, 470/67, 183, 185, 186, 187, 190, 207; 408/204, 207, 221, 239 R, 240; 72/409.01, 409.08, 409.13; 81/421, 424

(56) References Cited

U.S. PATENT DOCUMENTS

| | | |
|---|---|---|
| 3,956,787 A | 5/1976 | Crumpacker |
| 4,150,450 A | 4/1979 | Laub, Jr. et al. |
| 4,318,316 A * | 3/1982 | Guillians ..................... 81/421 |
| 4,346,491 A | 8/1982 | Kraus et al. |
| 4,386,542 A | 6/1983 | Verna |
| 4,889,460 A | 12/1989 | Laidlaw et al. |
| 4,934,171 A * | 6/1990 | Konetzke, Jr. ........... 72/409.01 |
| 5,113,727 A * | 5/1992 | Foster ......................... 81/421 |
| 5,224,900 A * | 7/1993 | Hai ............................ 470/185 |
| 5,288,181 A * | 2/1994 | Pinkston ..................... 470/207 |
| D355,825 S | 2/1995 | Moyer |

* cited by examiner

Primary Examiner—Ed Tolan

(57) ABSTRACT

A device for cleaning-and-restoring threads of a threaded article for more easily and efficiently cleaning and restoring threads of various sized threaded article. The device for cleaning and restoring threads of a threaded article includes a pliers comprising a handle having a first arm and a second arm pivotally coupled to the first arm. The pliers also include a pair of jaws. Each of the jaws is formed on one of the second ends of each of the arms. A pair of jaw extensions is provided for gripping, cleaning and reforming the threads of a threaded article. Each of the jaw extensions is coupled to and extending away from one of the jaws. Each of the jaw extensions includes an inner surface which are in an opposed relationship to each other. A plurality of teeth is provided for engaging the threads of the threaded article. Each of the teeth is attached to the inner surface of each of the jaw extensions. In one embodiment, threaded articles of various thread sizes are engagable by the teeth such that the threads of the threaded article are cleaned and reformed when the threaded article is rotated between the jaw extensions.

13 Claims, 2 Drawing Sheets

DEVICE FOR CLEANING AND RESTORING THREADS OF A THREADED ARTICLE

BACKGROUND OF THE INVENTION

1. Field of the Invention

The present invention relates to thread repair devices and more particularly pertains to a new device for cleaning and restoring threads of a threaded article for more easily and efficiently cleaning and restoring threads of various sized threaded article.

2. Description of the Prior Art

The use of thread repair devices is known in the prior art. More specifically, thread repair devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,346,491; 4,386,542; 4,150,450; 3,956,787; U.S. Pat. No. 4,889,460; and U.S. Pat. No. Des. 355,825.

While these devices fulfill their respective, particular objectives and requirements, the aforementioned patents do not disclose a new device for cleaning and restoring threads of a threaded article. The inventive device includes a pliers comprising a handle having a first arm and a second arm. The second arm is pivotally coupled to the first arm. The pliers also include a pair of jaws. Each of the jaws is formed on one of the second ends of each of the arms. A pair of jaw extensions is provided for gripping, cleaning and reforming the threads of a threaded article. Each of the jaw extensions is coupled to and extending away from one of the jaws. Each of the jaw extensions includes an inner surface which are in an opposed relationship to each other. A plurality of teeth is provided for engaging the threads of the threaded article. Each of the teeth is attached to the inner surface of each of the jaw extensions. In one embodiment, threaded articles of various thread sizes are engagable by the teeth such that the threads of the threaded article are cleaned and reformed when the threaded article is rotated between the jaw extensions.

In these respects, the device for cleaning and restoring threads of a threaded article according to the present invention substantially departs from the conventional concepts and designs of the prior art, and in so doing provides an apparatus primarily developed for the purpose of more easily and efficiently cleaning and restoring threads of various sized threaded article.

SUMMARY OF THE INVENTION

In view of the foregoing disadvantages inherent in the known types of devices for cleaning and repairing threads of a threaded article now present in the prior art, the present invention provides a new device for cleaning and restoring threads of a threaded article construction wherein the same can be utilized for more easily and efficiently cleaning and restoring threads of various sized threaded article.

The general purpose of the present invention, which will be described subsequently in greater detail, is to provide a new device for cleaning and restoring threads of a threaded article apparatus and method which has many of the advantages of the devices for cleaning and repairing threads of a threaded article mentioned heretofore and many novel features that result in a new device for cleaning and restoring threads of a threaded article which is not anticipated, rendered obvious, suggested, or even implied by any of the prior art devices for cleaning and repairing threads of a threaded article, either alone or in any combination thereof.

To attain this, the present invention generally comprises a pliers comprising a handle having a first arm and a second arm. The second arm is pivotally coupled to the first arm. The pliers also include a pair of jaws. Each of the jaws is formed on one of the second ends of each of the arms. A pair of jaw extensions is provided for gripping, cleaning and reforming the threads of a threaded article. Each of the jaw extensions is coupled to and extending away from one of the jaws. Each of the jaw extensions includes an inner surface which are in an opposed relationship to each other. A plurality of teeth is provided for engaging the threads of the threaded article. Each of the teeth is attached to the inner surface of each of the jaw extensions. In one embodiment, threaded articles of various thread sizes are engagable by the teeth such that the threads of the threaded article are cleaned and reformed when the threaded article is rotated between the jaw extensions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for cleaning and restoring threads of a threaded article apparatus and method which has many of the advantages of the devices for cleaning and repairing threads of a threaded article mentioned heretofore and many novel features that result in a new device for cleaning and restoring threads of a threaded article. which is not anticipated, rendered obvious, suggested, or even implied by any of the prior art devices for cleaning and repairing threads of a threaded article, either alone or in any combination thereof.

It is another object of the present invention to provide a new device for cleaning and restoring threads of a threaded article which may be easily and efficiently manufactured and marketed.

It is a further object of the present invention to provide a new device for cleaning and restoring threads of a threaded article which is of a durable and reliable construction.

An even further object of the present invention is to provide a new device for cleaning and restoring threads of a threaded article which is susceptible of a low cost of manufacture with regard to both materials and labor, and which accordingly is then susceptible of low prices of sale to the consuming public, thereby making such device for cleaning and restoring threads of a threaded article economically available to the buying public.

Still yet another object of the present invention is to provide a new device for cleaning and restoring threads of a threaded article which provides in the apparatuses and methods of the prior art some of the advantages thereof, while simultaneously overcoming some of the disadvantages normally associated therewith.

Still another object of the present invention is to provide a new device for cleaning and restoring threads of a threaded article for more easily and efficiently cleaning and restoring threads of various sized threaded article.

Yet another object of the present invention is to provide a new device for cleaning and restoring threads of a threaded article which includes a pliers comprising a handle having a first arm and a second arm. The second arm is pivotally coupled to the first arm. The pliers also include a pair of jaws. Each of the jaws is formed on one of the second ends of each of the arms. A pair of jaw extensions is provided for gripping, cleaning and reforming the threads of a threaded article. Each of the jaw extensions is coupled to and extending away from one of the jaws. Each of the jaw extensions includes an inner surface which are in an opposed relationship to each other. A plurality of teeth is provided for engaging the threads of the threaded article. Each of the teeth is attached to the inner surface of each of the jaw extensions. In one embodiment, threaded articles of various thread sizes are engagable by the teeth such that the threads of the threaded article are cleaned and reformed when the threaded article is rotated between the jaw extensions.

Still yet another object of the present invention is to provide a new device for cleaning and restoring threads of a threaded article that works with a variety of damaged threaded articles such as, for example, bolts, studs and pipes.

Even still another object of the present invention is to provide a new device for cleaning and restoring threads of a threaded article that, unlike the prior art that required more time and more individuals to clean and repair damaged threaded articles, allows a single individual to clean and repair threads of a threaded article.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
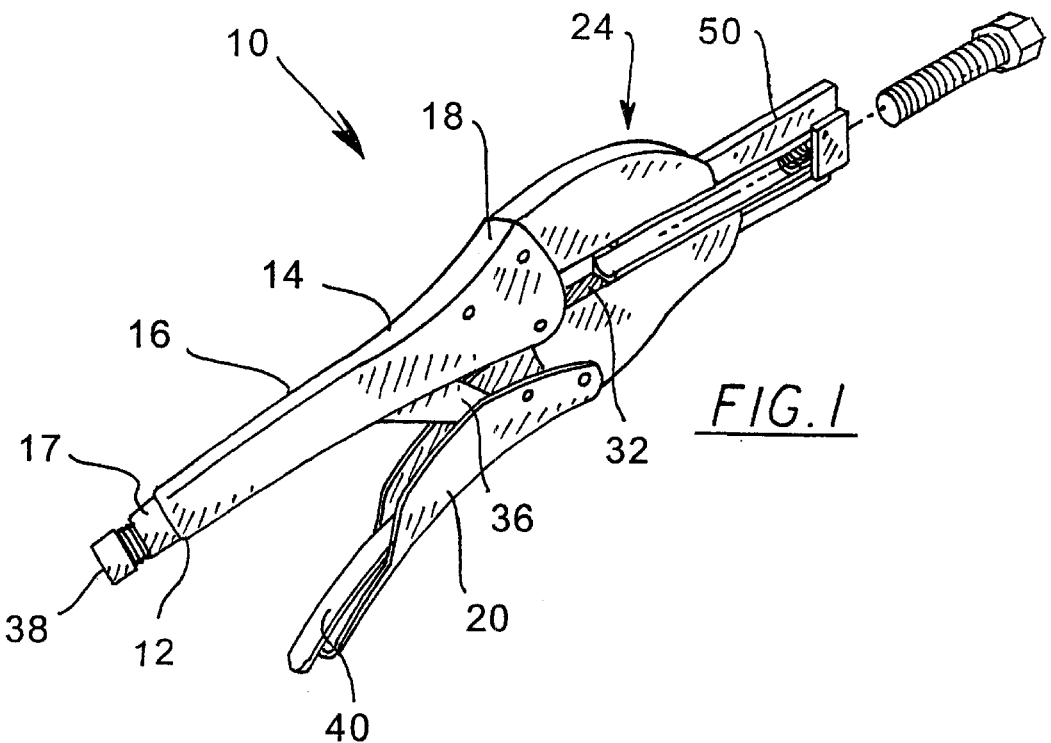
FIG. 1 Is a schematic perspective view of a new device for cleaning and restoring threads of a threaded article according to the present invention
Figure 2:
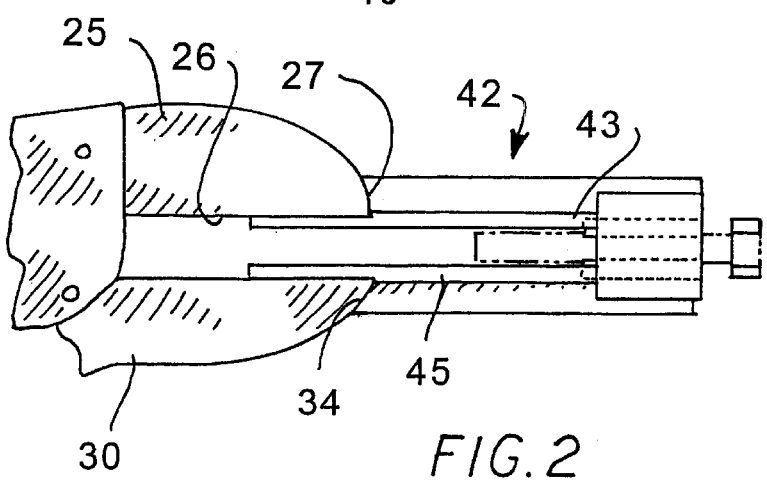
FIG. 2 is a schematic side view of the present invention showing a threaded article positioned between a pair of jaw extensions.
Figure 3:
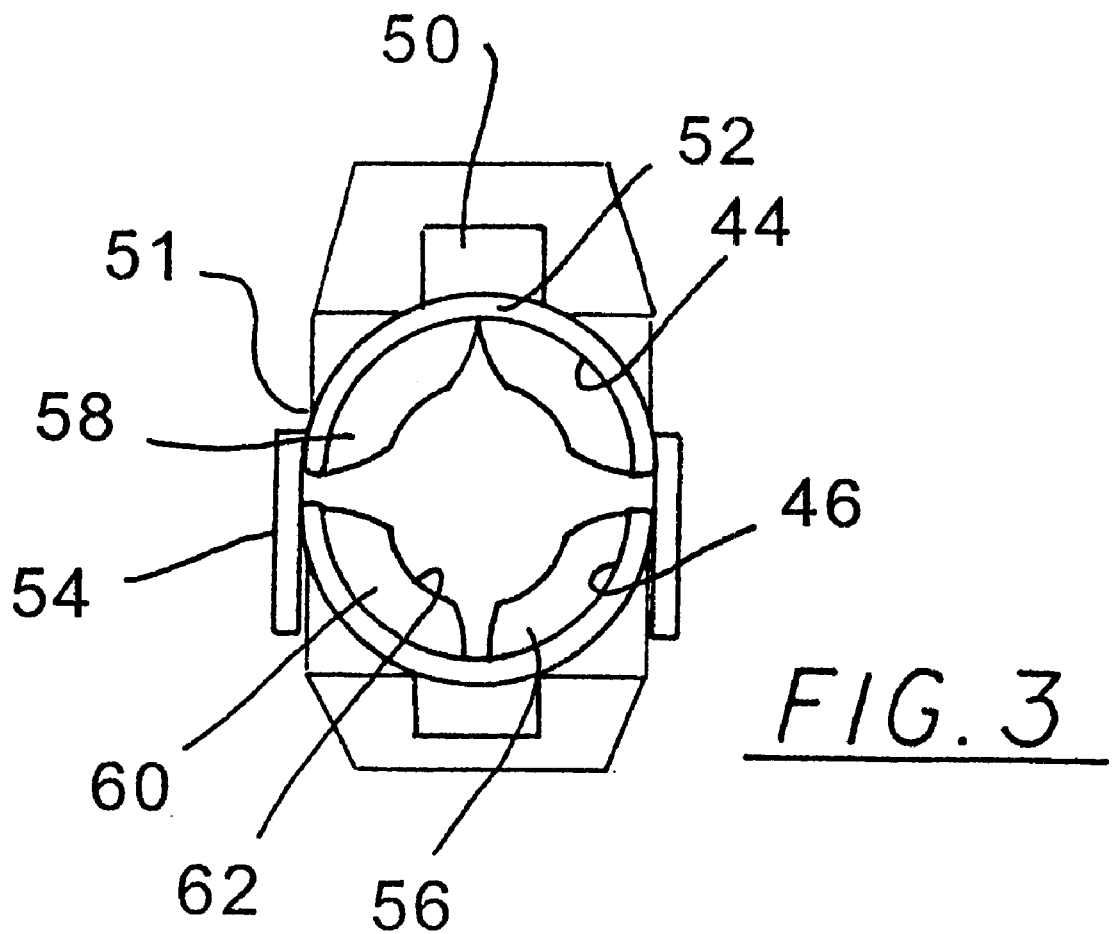
FIG. 3 is a schematic frontal view of the present invention showing a plurality of teeth being attached to the jaw extensions.

With reference now to the drawings, and in particular to FIGS. 1 through 3 thereof, a new device for cleaning and restoring threads of a threaded article embodying the principles and concepts of the present invention and generally designated by the reference numeral 10 will be described.

As best illustrated in FIGS. 1 through 3, the device for cleaning and restoring threads of a threaded article 10 generally comprises a pliers 12 that includes a handle 14, a pair of jaws 25 and 30 and a pair of jaw extensions 43 and 45. The handle 14 comprises a first arm 16 that includes a first end 17 and a second end 18. The handle 14 also includes a second arm 20 that is pivotally attached the first arm 16.

The pliers 12 also include a pair of jaws 24. Each of the jaws 24 is formed on one of the second ends 18 of each of the arms 16 and 20. The pair of jaws 24 includes a first jaw 25 that has a generally planar first surface 26 extending between the handle 14 and an end 27 of the first jaw 25.

The pair of jaws 24 also includes a second jaw 30. The second jaw 30 that has a generally planar second surface 32 extending between the handle 14 and an end of the jaw 34. The first planar surface 26 of the first jaw 25 is positioned generally opposite to the second planar surface 32 of the second jaw 30.

In one embodiment, the pair of jaws 24 is movably positionable between an open and closed position. The open position is defined by the jaws 24 moving relatively apart from each other. The closed position is defined by the jaws 24 moving relatively closer together. The pliers 12 may comprise a substantially rigid material, such as, for example, steel or iron.

In one embodiment, a locking means 36 is provided for locking the jaws 24 in the closed position. The locking means 36 is coupled to the arms 16 and 18. The locking means 36 may comprise a bar adapted for locking said second arm 20 to said first arm 20.

In one embodiment, a jaw adjustment 38 may be coupled to the first arm 16 of the handle 14. The jaw adjustment 38 is designed to adjust the relative spacing of the jaws 24 in the closed position. The jaw adjustment 24 preferably comprises a threaded member.

A lock release 40 may be pivotally coupled to the second arm 20 such that when the lock release 40 is activated the locking means 36 releases causing the jaws 24 to move from the closed position to the open position. The lock release 40 preferably comprises a substantially rigid material such as, for example, steel or iron.

A pair of jaw extensions 42 is provided for gripping, cleaning and reforming the threads of a threaded article. A first 43 of the jaw extensions 42 is attached to the first surface 26 of the first jaw 25 in a manner such that the first jaw extension 43 extends away from the first jaw 25. The first jaw 43 extension includes an inner surface 44 that has a generally convex shape. The first jaw extension 43 preferably lies in a plane extending along an axis extending generally in a direction of a longitudinal axis of the first arm 16.

A second 45 of the jaw extensions 42 is attached to the second surface 32 of the second jaw 30 in a manner such that the second jaw extension 45 extends away from the second jaw 30. The second jaw extension 45 includes an inner surface 46 that has a generally concave shape. The inner surfaces 44 and 46 of the first jaw extension 43 and the second jaw extension 45 forming a generally oval shape when the jaws 24 are positioned in the closed position. The second jaw extension 45 extends in a direction of the longitudinal axis of the first arm 16 when each of the jaws 24 are positioned in the closed position.

A pair of flanges 50 may be provided to increase support to each of the jaw extensions 43 and 45. Each of the flanges 50 is attached to and extends away from an outer surface 51 of one of the jaw extensions 43 and 45. Each of the flanges 50 extends from the first end 27 of each of the jaws 25 and 30 to a free end 52 of each of the jaw extensions 25 and 30.

A pair of tabs 54 may be provided for aligning the jaw extensions 43 and 45 when the jaws 25 and 30 are in the closed position. Each of the tabs 54 is attached to and extends away from the outer surface 51 of the first jaw extension 43. Each of the tabs 54 is positioned generally adjacent to the free end 52 of the first jaw extension 43. Each of the tabs 54 extending adjacent to the second jaw extension 45 when the jaws 25 and 30 are positioned in the closed position. Each of the tabs 54 is orientated generally parallel to each other. Each of the tabs 54 may comprise a substantially rigid material such as, for example, steel or iron.

A plurality of teeth 56 is provided for engaging the threads of the threaded article. A first pair of teeth 58 is attached to the inner surface 44 of the first jaw extension 43. A second pair of teeth 60 is attached to the inner surface 46 of the second jaw extension 45. An interior edge 62 of each of the teeth 56 includes a generally arcuate shape designed for positioning in the threads of the thread article. Significantly, the teeth are positioned such that the threads of a threaded article are engageable by the teeth of each of the jaw extensions in a manner permitting rotation of the threaded article while engaged by the teeth.

In use, articles of various thread sizes are engagable by the teeth 56 such that the threads of the threaded article are cleaned and reformed when the threaded article is rotated between the jaw extensions 43 and 45.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for cleaning and restoring threads of an article, said device comprising:
    a pliers comprising:
        a handle, said handle comprising:
            a first arm;
            a second arm being pivotally coupled to said first arm;
        a pair of jaws, each of said jaws being formed on one of said second ends of each of said arms;
    a pair of jaw extensions for gripping, cleaning and reforming the threads of a threaded article, each of said jaw extensions being coupled to and extending away from one of said jaws, each of said jaw extensions having an inner surface, said inner surfaces of said jaw extensions being in an opposed relationship;
    a plurality of teeth for engaging the threads of the threaded article, each of said teeth being attached to said inner surface of each of said jaw extensions;
    wherein threaded articles of various thread sizes are engagable by said teeth such that the threads of the threaded article are cleaned when said threaded article is rotated between said jaw extensions.

2. The device of claim 1, wherein, each of said pair of jaws comprises:
    a first jaw having a generally planar first surface extending between said handle and an end of said first jaw; and
    a second jaw having a generally planar second surface extending between said handle and an end of said second jaw, said first planar surface of said first jaw being positioned generally opposite to said second planar surface of said second jaw.

3. The device of claim 1, wherein each of said jaws are movably positionable between an open and closed position, wherein said open position is defined by said jaws being moved relatively apart from each other, said closed position is defined by said jaws being moved relatively closer together.

4. The device of claim 3, additionally comprising a locking means for locking said jaws in said closed position, said locking means being coupled to said arms.

5. The device of claim 4, additionally comprising a jaw adjustment being coupled to said first arm, said jaw adjustment being adapted to adjust the relative spacing of the jaws in the closed position.

6. The device of claim 5, additionally comprising a lock release being pivotally coupled to said second arm such that when said lock release is activated said locking means releases causing said jaws to move from said closed position to said open position.

7. The device of claim 1, wherein said inner surface of a first of said jaw extensions has a generally convex shape, a pair of said teeth being attached to said inner surface of said first jaw extension.

8. The device of claim 7, wherein said inner surface of a second of said jaw extensions has a generally concave shape, said inner surfaces of said first jaw extension and said second jaw extension forming a generally oval shape when said jaws are positioned in a closed position, a pair of said teeth being attached to said inner surface of said second jaw extension.

9. The device of claim 1, additionally comprising a pair of flanges, each of said flanges being attached to and extending away from an outer surface of one of said jaw extensions.

10. The device of claim 1, additionally comprising a pair of tabs for aligning said jaw extensions when said jaws are in said closed position.

11. The device of claim 10, wherein each of said tabs is attached to and extends away from an outer surface of one of said jaw extensions.

12. The device of claim 1, wherein an interior edge of each of said teeth has a generally arcuate shape adapted for positioning in the threads of the threaded article.

13. A device for cleaning and restoring threads of a threaded article, said device comprising:

a pliers comprising:
 a handle, said handle comprising:
  a first arm having a first end and a second end;
  a second arm being pivotally attached said first arm;
 a pair of jaws, each of said jaws being formed on one of said second ends of each of said arms, said pair of jaws comprising:
  a first jaw having a generally planar first surface extending between said handle and an end of said first jaw, said first jaw comprising a substantially rigid material;
  a second jaw having a generally planar second surface extending between said handle and an end of said jaw, said first planar surface of said first jaw being positioned generally opposite to said second planar surface of said second jaw, said second jaw comprising a substantially rigid material;
  wherein each of said jaws are movably positionable between an open and closed position, wherein said open position is defined by said jaws being moved relatively apart from each other, said closed position is defined by said jaws being moved relatively closer together, said handle comprising a substantially rigid material;
 a locking means for locking said jaws in said closed position, said locking means being coupled to said arms;
 a jaw adjustment being coupled to said first arm, said jaw adjustment being adapted to adjust the relative spacing of the jaws in the closed position, said jaw adjustment comprising a threaded member;
 a lock release being pivotally coupled to said second arm such that when said lock release is activated said locking means releases causing said jaws to move from said closed position to said open position;
a pair of jaw extensions for gripping, cleaning and reforming the threads of a threaded article:
 a first of said jaw extensions being attached to said first surface of said first jaw in a manner such that said first jaw extensions extends away from said first jaw, said first jaw extension having an inner surface having a generally convex shape, said first jaw extension lies in a plane extending along an axis extending generally in a direction of a longitudinal axis of said first arm;
 a second of said jaw extensions being attached to said second surface of said second jaw in a manner such that said second jaw extension extends away from said second jaw, said second jaw extension having an inner surface having a generally concave shape, said inner surfaces of said first jaw extension and said second jaw extension forming a generally oval shape when said jaws are positioned in said closed position, said second jaw extension extending in a direction of the longitudinal axis of said first arm when each of said jaws are positioned in said closed position;
 a pair of flanges, each of said flanges being attached to and extending away from an outer surface of one of said jaw extensions, each of said flanges extending from said first end of each of said jaws to a free end of each of said jaw extensions;
 a pair of tabs for aligning said jaw extensions when said jaws are in said closed position, each of said tabs being attached to and extending away from said outer surface of said first jaw extension, each of said tabs being positioned generally adjacent to said free end of said first jaw extension, said tabs extending adjacent to said second jaw extension when said jaws are positioned in said closed position, each of said tabs being orientated generally parallel to each other, each of said tabs comprising a substantially rigid material;
 a plurality of teeth for engaging the threads of the threaded article, a first pair of teeth being attached to said inner surface of said first jaw extension, a second pair of teeth being attached to said inner surface of said second jaw extension, an interior edge of each of said teeth having a generally arcuate shape adapted for positioning in the threads of the thread article;
wherein articles of various thread sizes are engagable by said teeth such that the threads of the threaded article are cleaned and reformed when said threaded article is rotated between said jaw extensions.

* * * * *